United States Patent [19]

Shay

[11] Patent Number: 4,536,407

[45] Date of Patent: Aug. 20, 1985

[54] FUNCTIONAL PROTEIN PRODUCTS

[75] Inventor: Lucas K. Shay, Bartlesville, Okla.

[73] Assignee: Phillips Petroleum Company, Bartlesville, Okla.

[21] Appl. No.: 518,593

[22] Filed: Jul. 29, 1983

[51] Int. Cl.$^3$ .......................... A23D 5/00; A23J 3/00; A23L 1/27

[52] U.S. Cl. .................................. 426/250; 426/564; 426/602; 426/656; 260/112 R

[58] Field of Search .............. 426/656, 564, 250, 602; 260/112 R

[56] References Cited

U.S. PATENT DOCUMENTS

| | | |
|---|---|---|
| 2,809,113 | 10/1957 | Stimpson et al. |
| 3,579,631 | 5/1971 | Stewart, Jr. et al. |
| 3,615,654 | 10/1971 | Ayukawa et al. |
| 3,694,221 | 9/1972 | Hoer et al. |
| 3,720,585 | 3/1973 | Tannenbaum et al. |
| 3,809,776 | 5/1974 | Chao . |
| 3,833,552 | 9/1974 | Akin . |
| 3,862,112 | 1/1975 | Ishida et al. |
| 3,903,314 | 9/1975 | Chao . |
| 3,960,659 | 6/1976 | Fazakerley . |
| 3,968,009 | 7/1976 | Tannenbaum et al. |
| 4,005,062 | 1/1977 | Schnell . |
| 4,016,300 | 4/1977 | Arnold et al. ................ 426/656 X |
| 4,054,679 | 10/1977 | Melcer et al. |
| 4,079,048 | 3/1978 | Chao . |
| 4,192,897 | 3/1980 | Kajinami et al. |
| 4,293,575 | 10/1981 | Cockram et al. |
| 4,341,802 | 7/1982 | Hopkins . |

FOREIGN PATENT DOCUMENTS

| | | |
|---|---|---|
| 1161229 | 8/1969 | United Kingdom . |
| 1322125 | 7/1973 | United Kingdom . |

OTHER PUBLICATIONS

Stewart and Russell, *Critical Reviews in Biotechnology*, vol. 1, Issue 1, (1983), pp. 34–37, 55 and 56.

*Nature*, vol. 228, Oct. 10, 1970, p. 181.

Sato et al., "Whipping Property of the Protein Isolated from Hansenula Yeast Grown on Methanol", *Lebensm. Wiss. U. Technol.*, 12, 41, 1979.

Castro et al., "Reduction of Nucleic Acid Content in Candida Yeast Cells by Bovine Pancreatic Ribonclease A Treatment", *Applied Microbiology*, vol. 22, No. 3, Sep. 1971, pp. 422–427.

Kinsella, "Functional Properties in Novel Proteins", *Chemistry and Industry*, 5 Mar. 1977, pp. 177–182.

Kinsella, "Functional Properties of Proteins in Foods: A Survey", *CRC Crit. Rev. Food Sci. Nutri.* 7, pp. 219–280, (1976).

Kinsella et al., "Yeast Proteins Recovery Nutritional and Functional Properties", *Adv. Exp. Med. Biol.*, 105, pp. 797–825, (1978).

Nesmeyanov et al., "Isolation of Food–Acceptable Compounds from Hydrocarbon–Cultivated Yeasts and the Use of These Compounds for Preparing Food–Grade Products", *Proceedings of the 8th World Petroleum Congress*, vol. 5, (1971), pp. 141–148.

Sinsky et al., "Removal of Nucleic Acids in SCP", Chapter 7 of *Single Cell Protein II*, (Tannenbaum & Wang, Editors), pp. 158–178, (M.I.T. Press 1975).

Vananuvat et al., "Some Functional Properties of Protein Isolates from Yeast, *Saccharomyces fragilis*", *J. Agri. Food* 23 Jul./Aug. 1975, pp. 613–616.

Zee et al., "Simple Process for the Reduction in the Nucleic Acid Content in Yeast", *Applied Microbiology*, vol. 29, No. 1, Jan. 1975, pp. 59–62.

*Primary Examiner*—Robert Yoncoskie
*Attorney, Agent, or Firm*—Lyell H. Carver

[57] ABSTRACT

A comestible whipped protein product produced by treating yeast cells for nucleic acid reduction under basic and acidic conditions followed by treating the nucleic reduced cells with a relatively high temperature short-time heat-shock, and whipping.

31 Claims, No Drawings

FUNCTIONAL PROTEIN PRODUCTS

FIELD OF THE INVENTION

The invention pertains to whippable protein products. In another aspect, the invention pertains to methods to produce a whippable protein product from microbial cells. In a further aspect, the invention pertains to whipped nucleic acid-reduced proteins.

BACKGROUND OF THE INVENTION

A protein product for commercial acceptance should have good functional properties as well as be suitable for human consumption.

Microbial cells have high potential as protein sources, being relatively cheaply grown on a wide variety of substrates. However, the nucleic acid content of microbial protein initially is high. Such proteins, unless reduced in nucleic acid content can be used by humans only in very limited amounts. A variety of means have been developed for reduction in nucleic acid content.

Even though technically usable, the nucleic acid-reduced protein products still need acceptable functional properties, such as whippability, before broad acceptance in the market place as a food qualtity product.

BRIEF SUMMARY OF THE INVENTION

I have discovered a process of producing microbial cellular protein, from yeasts, by a method that results in a product of low nucleic acid content and high whippability. The process of my invention briefly comprises:

(A) reducing the nucleic acid content of the microbial yeast cells, (B) heat-shocking the so-treated cells at elevated temperatures for a very short time; optionally, separating the water soluble fraction from the water insolubles, and (C) whipping the treated whole cells from step (B); or less preferably the soluble fraction from step (B).

The product resulting from this series of steps is comestible, has very low nucleic acid content, and exhibits good functionality, i.e., whippability.

Functional properties is a collective term for those physicochemical properties of proteins which govern their composite performance in foods during manufacturing, processing, storage, and consumption, reflecting the properties of the protein that are influenced by its composition, conformation, and interactions with other food components. Functional properites include the important properties of whippability and foam capability and stability, Kinsella, J. E. "Functional Properties of Proteins in Foods: A Survey", *CRC Critical Reviews in Food Sci. and Nutr.* 7, 219 (1976).

DETAILED DESCRIPTION OF THE INVENTION

Yeasts

In accordance with my invention, yeasts are employed. Typically, yeasts can be grown on a suitable carbon energy source (substrate), under aerobic aqueous fermentation conditions employing assimilable nitrogen-source, mineral salts aqueous media, molecular oxygen, with suitable pH and other controls, all as known in the art.

The carbon energy substrate can be any carbon energy source, such as hydrocarbons, oxygenated hydrocarbons, including various carbohydrates, and the like, suitable as yeast substrates. It is recognized that particular yeasts do vary in their preference for various substrates.

The presently preferred substrates for aqueous fermentation conditions are the oxygenated hydrocarbons or carbon-oxygen-hydrogen (C—O—H) compounds which are significantly water-soluble. The term C—O—H is intended to be a generic term in this disclosure descriptive of compounds employable, and not necessarily a limiting term referring to the source of the substrate. For this disclosure, the C—O—H compounds include the water-soluble carbohydrates, as well as those alcohols, ketones, esters, acids, and aldehydes, and mixtures, which are reasonably significantly water-soluble in character, generally of 1 to 20 carbon atoms per molecule. Preferred are the C—O—H compounds which exhibit the greater water-solubility. Preferred are the water-soluble linear monohydric aliphatic hydrocarbyl alcohols, particularly methanol and ehtanol.

It also is possible to employ in accordance with my process normal paraffins of such as 10 to 20 carbon atoms per molecule, though much less preferred because of the sometimes difficulty in removing residual substrate from the single cell protein cells. Yeasts generally do not assimilate paraffins of less than 10 carbon atoms per molecule.

Scope of Microorganisms

Broadly contemplated by the present invention are all yeasts. Preferably, yeast strains are chosen from the following genera: Saccharomyces, Candida, Torulopsis, Pichia, Hansenula, Kluyveromyces, and Kloeckera. Exemplary species include:

| | |
|---|---|
| *Saccharomyces cerevisiae* | *Torulopsis methanosorbosa* |
| *Candida boidinii* | *Torulopsis methanothermo* |
| *Candida methanolica* | *Pichia lindnerii* |
| *Candida tropicalis* | *Pichia pastoris* |
| *Candida utilis* | *Pichia pinus* |
| *Torulopsis methanolovescens* | *Hansenula polymorpha* |
| *Torulopsis methanophiles* | *Kluyveromyces fragilis* |

Most preferred are yeasts of the Candida, Saccharomyces, and Pichia genera, of these particularly, *Saccharomyces cerevisiae, Candida utilis,* and *Pichia pastoris,* particularly such as it Pichia pastoris NRRL Y-11430 and Y-11431.

Yeast cells in general can be employed, including pre-produced, separated from aqueous ferment, and/or dried. Fresh cells from a continuous producing fermentation preferably are employed.

A. Nucleic Acid Reduction

Nucleic acid reduction should be accomplished by a method that avoids significant lysis of the cells.

The aqueous ferment (suspended cells plus aqueous medium) exiting the fermentation step contains both supernatant aqueous liquor and suspended cells. The cells can be separated, by such as centrifugation or filtering, water-washed if desired, and resuspended in water. Alternatively, the cell concentration in the aqueous ferment can be increased, if needed, by vacuum filtration, solvent removal, or the like. If the aqueous ferment is from a high cellular density fermentation, it can be used as is in some nucleic acid removal processes.

One suitable process treats the cells without significant lysis as a cell cream containing a solids content of about 10 to 25, preferably 12 to 20, weight percent (dry basis) with a base such as NH₄OH to a pH of such as about 7 to 10, preferably 8.5 to 10, accompanied with heating to a temperature in the range of about 65° C. to 99° C., preferably 85° C. to 99° C., for a base-treating time of about 15 to 120 minutes, preferably 30 to 60 minutes. Thereafter, the cells are separated, and water-washed. While the cells remain substantially intact in this step, the base treatment step reduces substantially the nucleic acid content of the cells.

Suitable bases include ammonia, and ammonium and water soluble alkali metal and alkaline earth metal oxides, hydroxides, and carbonates, such as ammonium hydroxide, sodium hydroxide, potassium hydroxide, calcium hydroxide, potassium carbonate, and the like, and mixtures thereof.

The bases normally are employed in the form of water solutions, in as concentrated a form as is convenient. Thus, it is preferred to employ ammonia, or NH₄OH as a commercially available concentrated solution of about 28 weight percent.

Any other methods of nucleic acid reduction can be used, so long as the method employed is effective in reducing the nucleic acid content of the cells, without appreciable rupture of the cells (such that appreciable lysis is not effected). It is realized that in any of the methods employed that some cellular damage may occur to some of the cells, with some protein entering the aqueous treating solution. Such solubilized or extruded proteins can be separated and used for other food purposes.

Typical suitable methods include: treatment of cells with ammonia or ammonium hydroxide with an alcohol such as methanol, South Africa 774517; treatment of cells with extra-cellular ribonuclease, U.S. Pat. No. 3,960,659; degradation of nucleic acids with endogenous nucleases, U.S. Pat. No. 3,809,776; treatment of cells with anhydrous liquid ammonia, U.S. Pat. No. 3,615,654; other methods for removal of nucleic acids from single cell protein materials as described in *Single Cell Protein II*, S. R. Tannenbaum and D. I. C. Wang, editors (The MIT Press, 1975), Chapter 7, pages 158–178 by Sinsky and Tannenbaum, as disclosed therein, including base-catalyzed hydrolysis and chemical extraction with chemicals such as hot sodium chloride solution or phenol; and acid treatment of a cell containing broth, U.S. Pat. No. 4,341,802.

Where nucleic acid removal is accomplished by a first acid- or base-treatment step, a second treatment of opposite pH (i.e., acidic wash followed by base wash or base wash followed by acidic wash) optionally can be employed. Where acid treatment is to be employed following an initial base treatment, a pH of about 3 to 5 for 20 to 50 minutes at 80° C.-95° C. typically is employed.

The treated cells preferably are separated, such as by centrifugation, from the aqueous treating liquor.

Preferably, separated nucleic acid reduced cells are washed with such as about 1 to 4 volumes of water per volume of packed cells to remove essentially all traces of treating chemicals prior to the next step in the process of my invention, to aid removal of solubilized but adsorbed or adsorbed nucleic acids and to avoid potential equipment corrosion.

B. Heat-Shock Treatment

The nucleic acid-reduced cells are re-admixed with sufficient water to form a cell cream of a cellular concentration (solids content) of about 10 to 25, preferably 12 to 20, weight percent (dry basis).

The cellular cream then is subjected to a short-time heat-shock at a temperature of about 110° C. to 160° C., preferably about 120° C. to 140° C., for a time of about 40 to 200 seconds, preferably about 80 to 120 seconds.

The heat-shock step can be accomplished by any suitable means such as by pumping the cream through a heated coil or tubing or heat exchanger sufficient to attain the elevated temperature short-time heat-shock treatment. Pressure is not considered critical, and the cream can be pumped therethrough at pressures as convenient, such as about 10 to 100 psig, preferably 20 to 50 psig.

For example, a ¼" to ⅜" ID stainless steel tubing coil externally heated by high pressure steam, such as at 30 psig and 140° C., including convenient means to vary the tubing length and pumping rate to achieve the desired residence time can be used to provide a suitable throughput.

The residence time required to achieve a product with improved functional properties typically will be less for a higher temperature treatment than the residence time required for a lower temperature treatment, within the temperature range indicated above. Presently considered suitable is a cream residence time in the heated zone of about 60 to 120 seconds.

A-B Nucleic Acid Reduction and Heat-Shock

Alternatively, and conveniently, the nucleic acid removal and heat shock to impart improved functional properties (whippability) to the protein product can be carried out coincidentally, i.e., essentially at the same time.

Thus, a crude fermentation effluent can be adjusted to pH of about 9 to 11 with a suitable base as described previously, and then subjected to heat shock conditions as described above.

The so-treated effluent can then be separated into (a) an insoluble cellular fraction of reduced nucleic acid content, and (b) a liquid fraction which also will have good functional properties though containing much of the nucleic acids.

(C) Whipping

The heat-shocked cells from step (B), or the cellular fraction from step (A-B), preferably are reduced in water content, and, if desired, dried. Reduction in water content and/or drying can be accomplished by spray drying, drum drying, freeze drying, or the like. For example, spray drying can be employed using an inlet temperature of such as about 540° F., and an outlet temperature of such as about 210° F.

The product of my process is a comestible, functional, protein product exhibiting good whippability, forming a highly stable foam. This property is important in use of the protein in food products to provide good mixing, particularly in preparing light, fluffy comestibles with minimum weights of ingredients.

For whipping, the product is mixed with water, and whipped or beaten, such as in a blender, a sufficient speed and under conditions effective to admix air therewith to produce a foam of desired thickness, texture, creaminess, and gaseous content. Other gases can be used, if desired, such as nitrogen. Colorants, or GRAS character, can be employed to impart tints or colorations as may be desired. Two or more foams of differing tints can be lightly mixed to produce stable multi-colored (parti-colored) foam swirls.

The whipped material can be incorporated into various food-stuffs after whipping. Or, the basic product can be incorporated with other food components and then whipped. In either case, the whipped material adds volume, stability, good quality protein, at low weight and low-cost.

EXAMPLES

Examples provided are intended to assist in a further understanding of my invention. Particular materials employed, species, conditions, are intended to be further illustrative of our invention and not limitative of the reasonable scope thereof.

EXAMPLE I

The following fermentation is typical of the several fermentations carried out to provide cell-containing effluent for further treatment as described in the following examples.

In a continuous aerobic fermentation process, methanol and an aqueous mineral salts medium in a volume ratio of about 40 to 60, respectively, were fed individually to a fermentor, inoculated with the yeast species *Pichia pastoris* NRRL Y-11430, at a rate such that methanol was the growth-limiting factor. The fermentor was a 1500-liter foam-filled fermentor with a liquid volume of about 610 liters, with automatic pH, temperature, and level control. Agitation was provided by two conventional paddle-type turbines driven at 1000 rpm. The aeration rate was about 4 volumes of air (at about 38 psig and about 25° C.) per volume of ferment in the fermentor per minute. Anhydrous ammonia was added at a rate sufficient to maintain a pH of about 3.5 in the fermentation mixture.

The aqueous mineral salts medium was prepared by mixing, with each liter of tap water, 15.86 mL 75 wt percent $H_3PO_4$, 9.53 g $K_2SO_4$, 7.8 g $MgSO_4.7H_2O$, 0.6 g $CaCl_2.2H_2O$, and 2.6 g 85 wt percent KOH. The aqueous mineral salts medium was fed at a rate of 31.5 liters per hour and the methanol at a rate of 21 liters per hour.

The trace mineral solution was prepared by mixing, for each liter of solution 65 g $FeSO_4.7H_2O$, 20 g $ZnSO_4.7H_2O$, 3.0 g $MnSO_4.H_2O$, 6.0 g $CuSO_4.5H_2O$, 5.0 mL conc. $H_2SO_4$, and sufficient deionized water to make 1 liter of solution. The trace mineral solution plus biotin was prepared by mixing 780 mL of a trace mineral solution, 20 mL water, 200 mL methanol and 0.032 g biotin. The trace mineral solution plus biotin was fed separately via the methanol stream at a rate of 10 mL per liter of methanol.

The fermentation was conducted at about 30° C. and about 38 psig pressure, with an average retention time of about 11.6 hours. The cell density typically was about 128.4 g of cells per liter of fermentor effluent. The total solids content of the ferment typically was about 134.7 g per liter.

The resulting yeast cells were separated from the fermentation effluent (aqueous ferment) by centrifugation, washed by suspension in water, followed by recentrifugation, dried overnight at 100° C., and weighed. On a dried basis, the yield of yeast cells typically was about 40.6 g per 100 g of methanol fed.

EXAMPLE II

Nucleic Acid Reduced SCP (NARP)

Fermentor effluent, as obtained from runs as described in Example I, was adjusted to a pH of 9.0 to 9.5 with concentrated $NH_4OH$ solution, then heated to 90° C. to 95° C. for 20 to 40 minutes. The resulting cellular dispersion (suspension) was centrifuged, and the liquid removed and discarded. The cell paste was resuspended in about 4 volumes fresh water, then centrifuged again. The supernatant liquid was discarded. The cell paste was collected for further processing. This material was designated as nucleic acid reduced protein (NARP).

EXAMPLE III

Preparation of NARP (AS)

The $NH_4OH$ treated cells, prepared as described in Example II, were resuspended in water to a concentration of about 12 to 20 wt percent, and the dispersion adjusted to a pH of 4.2 with sulfuric acid. The dispersion was heated to 85° C. for 30 minutes. The resulting dispersion was centrifuged, and the liquid removed and discarded. The cell paste was resuspended in about 4 volumes fresh water, again centrifuged, and the supernatant liquid discarded. The cell paste was collected for further processing. This acid-treated material was designated as NARP (AS).

EXAMPLE IV

Preparation of NARP (AO)

NARP, prepared as described in Example II, was further treated. The washed cells were resuspended in water to a concentration of about 12 to 20 wt percent, then treated with 2 mL of 30% $H_2O_2$ per liter of total cell suspension and heated to 60° C. for 15 minutes. The resulting suspension was centrifuged, and the liquid removed and discarded. The cell paste was resuspended in about 4 volumes fresh water, again centrifuged, and the supernatant liquid discarded. The cell paste was collected for further processing. This ammonium hydroxide and peroxy-treated material was designated as NARP (AO).

EXAMPLE V

The heat-shock step typically was carried out employing a cell cream containing from 120 to 200 g of cells/L (dry basis). More concentrated cream tends to plug the tubing at the operating conditions employed, while cream less concentrated than 120 g/L is less efficient than the typical operating range employed. The cream employed was the washed effluent from a prior acid- or base-treatment. Thus, a heat-shocked cream typically had a pH in the range of about 5-8.5.

Heat Shock of NARP (AS) and NARP (AO)

A cell suspension, prepared as described in Examples III or IV, was subjected to heat-shock conditions. The cell suspension (cream) was pumped via stainless steel tubing (¼" 316SS) through a coil of tubing (10 foot length, 3" internal coil) placed in a silicon oil bath. The oil bath was maintained at about 140° C., reaction pressure of about 30 psig employed, and residence time of cell suspension in the heat bath adjusted to about 80 seconds by varying the pumping rate and/or the length of the first tubing coil. The tubing carried the cellular cream suspension through a second coil of tubing placed in an ice-bath to accomplish rapid cooling of the cell suspension.

The product was dried for feeding studies by lyophilizing or by employing a spray dryer.

Cells to be lyophilized were cooled at about −100° F. to −150° F. and pressure reduced to about 20 milli Torr, for about 6 to 24 hours as necessary to accomplish complete sample drying.

Spray drying was accomplished by feeding the treated cream into a rotating drum with filtered inlet air at about 540° F. Liquid feed rate was maintained so as to achieve an outlet air temperature of about 210° F. Under typical conditions, about 18 gallons/hour of cream were pumped through the spray dryer.

EXAMPLE VI Yeast Whippability

The whippability character of each of several different protein materials was measured by suspending 5 g of protein in 50 mL of water in a stoppered 100 mL graduated cylinder. Samples were shaken vigorously for one minute, then shaking discontinued, and the liquid and foam levels were measured at intermittent time intervals. Table I presents foam volumes over liquid volumes in mL:

TABLE I

| Run # | Time, min. | | | | |
|---|---|---|---|---|---|
| | 1 | 2 | 5 | 15 | 30 |
| 1 Whole Cell | 60 | 55 | 51 | 47 | 46 |
| | 26 | 30 | 34 | 37 | 38 |
| 2 NARP | 21 | 20 | 18 | 17 | 16 |
| | 40 | 41 | 42 | 43 | 43 |
| 3 NARP(AS) | 34 | 32 | 29 | 26 | 26 |
| | 38 | 40 | 41 | 44 | 44 |
| 4 NARP(AS)(HS) | 83 | 76 | 71 | 67 | 65 |
| | 21 | 28 | 32 | 35 | 37 |
| 5 NARP(AO)(HS) | 32 | 31 | 30 | 29 | 28 |
| | 37 | 38 | 39 | 40 | 41 |
| 6 NBC Soy Protein | 34 | 33 | 31 | 27 | 23 |
| | 41 | 42 | 44 | 46 | 48 |

The results of these runs demonstrate that the whipped foam of Run 4 is far greater in volume and far more stable than any other. The described microbial cell treatment results in a whipped product with improved foaming ability and foam stability.

Merely ammonium hydroxide treating the cells (compare "whole cell" Run 1 to "NARP" Run 2 entries) appears to decrease the foaming ability of single cell protein. A subsequent sulfuric acid treatment had little effect on the foaming ability of the SCP (see "NARP-(AS)" Run 3 entry). Run 5 indicates that an oxidizing treatment of the single cell protein material should be avoided.

The heat-shocked product, NARP (AS) (HS) of Run 4, however, shows a marked distinctive highly improved foam in quantity and stability was compared to the other materials and Runs tested.

EXAMPLE VII

Yeast Emulsifying Ability

Emulsifying ability was measured. Protein (1.75 g) was placed in a 50 mL graduated cylinder, and water added to give a total volume of 20 mL, mixed well to give a suspension, and then poured into a Waring Blender jar. The graduated cylinder was rinsed with 5 mL of water, which also was added to the blender jar to ensure complete transfer of the protein material. Mazola corn oil (25 mL) then was added to the blender jar, and the mixture blended at maximum speed for 1 minute. A portion of the resultant emulsion was poured into a centrifuge tube and spun for 5 minutes at 2000 rpm. The volume of the emulsified layer was divided by the total volume of mixture multiplied by 100 to determine the Emulsifying Index of the sample. Results are shown in Table II:

TABLE II

| Sample | Total Volume, mL | Emulsion Volume, mL | Emulsifying Index, % |
|---|---|---|---|
| Whole Cell (Run 1) | 14.7 | 9.4 | 63.9 |
| NARP(AS)(HS) (Run 4) | 14.5 | 8.1 | 55.9 |
| NBC Soy Protein (Run 6) | 14.8 | 8.0 | 54.1 |

The results of these runs demonstrate that NARP-(AS) (HS) (from Run 4) has emulsion-forming capabilities comparable to soy protein. Compared to the emulsion formed from whole cell SCP (Run 1), the emulsion from the protein of Run 4 was a whiter, denser, and thicker emulsion.

The stability of the emulsions obtained above was tested by adjusting the emulsion pH to basic or acidic pH until the emulsion broke. The NARP(AS) (HS) emulsion of Run 4 had an initial pH of ~4.3 and withstood a pH of up to 12.5 before the emulsion began to liquefy, a greater stability than the others tested.

EXAMPLE VIII

Fermentor effluent, prepared as described in Example I, was adjusted to a pH of about 9.5 with a saturated solution of NaOH, then subjected to heat-shock conditions (130° C. for 2 minutes) employing the apparatus described above in Example V.

The treated cell suspension was separated by centrifugation into a solid and liquid fraction. A sample of the solid phase was analyzed for protein and nucleic acid content and found to have 58 wt percent protein and a nucleic acid content of 2.0 wt percent.

A sample of the liquid phase was analyzed for protein and nucleic acid content. First, the sample was lyophilized giving about 55 g/L of solubles. The protein content of the dried solubles was about 49 wt percent and nucleic acid content about 3.9 wt percent.

The whippability and emulsifying ability of the soluble heat-shocked fraction was evaulated.

Whippability was determined according to the procedure described in Example VI employing 5 g of the lyophilized material prepared above (Example VIII). Whippability data are reported in Table III as foam volumes over liquid volumes in mL:

TABLE III

| Time, min. | | | | |
|---|---|---|---|---|
| 1 | 2 | 5 | 15 | 30 |
| 92 | 85 | 73 | 57 | 31 |
| 13 | 20 | 32 | 43 | 49 |

Emulsifying ability was determined as described in Example VII, except that 3.5 g of lyophilized heat-shocked soluble material, 50 mL of water, and 50 mL of Mazola corn oil were employed. The average emulsifying index obtained from 6 separate determinations was 85%.

The "solubles" product exhibits good emulsifying characteristics. However, the foam quality and stability were below that of the foam of Run 4 (See Table I). Further, the nucleic acid content is higher than desirable, though tolerable in usages where smaller quantities are acceptable.

The disclosure, including data, illustrate the value and effectiveness of my invention. The Examples, the knowledge and background of the field of the invention and the general principles of biochemistry and of other applicable sciences have formed the bases from which the broad descriptions of my invention including the ranges of conditions and the generic groups of operant components have been developed, and formed the bases for my claims here appended.

I claim:

1. A functional protein product produced by the steps comprising:
   (a) base-treating nucleic acid-containing microbial yeast cells as an aqueous suspension of about 10 to 25 weight percent cells with ammonium or alkali metal hydroxide at a pH of about 9 to 9.5, a temperature of about 90° to 95° C., for a time of about 20 to 40 minutes,
   (b) water-washing the base-treated cells with water,
   (c) acid-treating the washed base-treated cells as an aqueous suspension of about 10 to 25 weight percent cells with sulfuric acid at a pH of about 3 to 5 for about 20 to 50 minutes at a temperature of about 80° to 95° C.,
   (d) water-washing the acid-treated base-treated cells,
   (e) creaming the acid-treated base-treated microbial yeast cells by admixing with sufficient water to prepare a cream containing about 10 to 25 weight percent cells, and
   (f) heat-shocking said cream under heat-shock conditions at a temperature of about 110° C. to 160° C. for a time of about 40 to 200 seconds.
   thereby preparing a functional protein product.

2. The functional protein product according to claim 1 dried as a dried product.

3. A functional protein product according to claim 2 further including a food-grade colorant.

4. A functional protein product according to claim 2 admixed with water.

5. A functional protein product emulsion comprising said admixture of claim 51 in further admixture with at least one of a gas and an edible oil sufficient to produce a protein product emulsion.

6. A foodstuff incorporating the emulsion product of claim 5.

7. A functional protein product according to claim 1 further including a food-grade colorant.

8. A functional protein product emulsion comprising an admixture of said heat-shocked cream of claim 1 admixed with an edible oil sufficient to form therewith an emulsion of increased protein content.

9. A foodstuff containing the protein product emulsion of claim 8.

10. A functional protein product emulsion comprising said heat-shocked cream of claim 1 in admixture with at least one of a gas, an edible oil, and a food-grade colorant, sufficient to form a protein product emulsion.

11. A foodstuff containing the protein product emulsion of claim 10.

12. A foodstuff employing the protein product according to claim 1 wherein said dried functional protein product is admixed with a foodstuff to thereby augment the protein content of said foodstuff.

13. A functional protein product according to claim 1 wherein said yeast cells are from a genus of yeast selected from the group consisting of Candida, Hansenula, Torulopsis, Saccharomyces, Pichia, Kluyveromyces, and Kloeckera.

14. The functional protein product according to claim 13 wherein said microbial yeast cells are selected from species selected from the group consisting of:

| | |
|---|---|
| Saccharomyces cerevisiae, | Torulopsis methanosorbosa, |
| Candida boidinii, | Torulopsis methanothermo, |
| Candida methanolica, | Pichia lindnerii, |
| Candida tropicalis, | Pichia pastoris, |
| Candida utilis, | Pichia pinus, |
| Torulopsis methanolovescens, | Hansenula polymorpha, and |
| Torulopsis methanophiles, | Kluyveromyces fragilis. |

15. The functional protein product according to claim 13 wherein said yeast cells are from species selected from the group consisting of Saccharomyces cerevisiae, Candida utilis, and Pichia pastoris.

16. The functional protein product according to claim 1 wherein said cream in said step (e) contains about 12 to 20 weight percent cells, and wherein said heat-shocking step (f) is conducted at heat-shock conditions of about 120° to 140° C. temperature for a time of about 80 to 120 seconds.

17. The process of preparing a functional protein product by the steps comprising:
   (a) base-treating nucleic acid-containing microbial yeast cells as an aqueous suspension of about 10 to 25 weight percent cells with ammonium or alkali metal hydroxide at a pH of about 9 to 9.5, a temperature of about 90° to 95° C., for a time of about 20 to 40 minutes,
   (b) water-washing the base-treated cells,
   (c) acid-treating the washed base-treated cells as an aqueous suspension of about 10 to 25 weight percent cells with sulfuric acid at a pH of about 3 to 5 for about 20 to 50 minutes at a temperature of about 80° to 95° C.,
   (d) water-washing the acid-treated base-treated cells,
   (e) creaming the acid-treated base-treated microbial yeast cells by admixing with sufficient water to prepare a cream containing about 10 to 25 weight percent cells, and
   thereby preparing a functional protein product.

18. The process according to claim 17 further drying said product as a dried product.

19. A process according to claim 18 further incorporating a food-grade colorant into the dried product.

20. The process of claim 18 further admixing said dried product with water, thereby forming a reconstituted cream.

21. The process according to claim 20 further whipping said reconstituted cream with at least one of a gas, an edible oil, and a food-grade colorant, to produce a protein product emulsion.

22. The process of claim 13 further incorporating said emulsion into a foodstuff.

23. A process according to claim 17 further incorporating food-grade colorant into the functional protein product.

24. The process according to claim 17 wherein said functional protein product is admixed with an edible oil to produce an emulsified edible oil.

25. The process according to claim 17 wherein said functional protein product is admixed with a foodstuff to thereby augment the protein content of said foodstuff.

26. The process according to claim 17 wherein said functional protein product further is admixed with at least one of a gas, an edible oil and a food-grade colorant to thereby form an emulsion.

27. The process according to claim 26 wherein said emulsion further is employed in admixture with a foodstuff.

28. The process of claim 64 further incorporating said functional protein product into a foodstuff.

29. The process according to claim 17 wherein said yeast cells are from a genus of yeast selected from the group consisting of Candida, Hansenula, Torulopsis, Saccharomyces, Pichia, Kluyveromyces, and Kloeckera.

30. The process according to claim 29 wherein said yeast cells are from species selected from the group consisting of *Saccharomyces cerevisiae, Candida utilis,* and *Pichia pastoris.*

31. The process according to claim 17 wherein said cream contains about 12 to 20 weight percent cells, and said heat-shocking step (f) is conducted at heat-shock conditions of about 120° to 140° C. temperature for a time of about 80 to 120 seconds.

* * * * *

UNITED STATES PATENT AND TRADEMARK OFFICE
CERTIFICATE OF CORRECTION

PATENT NO. : 4,536,407
DATED : August 20, 1985
INVENTOR(S) : Lucas K. Shay

It is certified that error appears in the above—identified patent and that said Letters Patent is hereby corrected as shown below:

Column 9, Claim 5, Line 2, delete "51" and add ---4---.

Column 10, Claim 22, Line 1, delete "13" and add ---21---.

Column 11, Claim 28, Line 1, delete "64" and add ---17---.

Signed and Sealed this

Twenty-fifth Day of March 1986

[SEAL]

Attest:

DONALD J. QUIGG

Attesting Officer

Commissioner of Patents and Trademarks